United States Patent [19]
Robertson

[11] Patent Number: 5,088,161
[45] Date of Patent: Feb. 18, 1992

[54] SEAT BELT SAFETY CLIP

[76] Inventor: Sharon L. Robertson, RR 2, Burns Lake, British Colombia, Canada, V0J 1E0

[21] Appl. No.: 512,776

[22] Filed: Apr. 20, 1990

[30] Foreign Application Priority Data

Nov. 8, 1989 [CA] Canada ............................ 2002676

[51] Int. Cl.$^5$ ................................................ A44B 11/25
[52] U.S. Cl. .......................................... 24/305; 24/199; 297/483
[58] Field of Search ............... 24/198, 168, 169, 164, 24/163 R, 182, 265 BL, 265 EC, 305, 307, 319, 199, 326; 224/252, 253, 269; 297/468, 482, 483

[56] References Cited

U.S. PATENT DOCUMENTS

| | | | |
|---|---|---|---|
| 205,348 | 6/1878 | Buchholz | 24/199 |
| 379,613 | 3/1888 | Smith | 24/168 |
| 1,227,042 | 5/1917 | Crumrine | 24/199 |
| 3,579,745 | 5/1971 | Wilson | 24/307 |
| 4,236,755 | 12/1980 | Pollitt et al. | 297/468 X |
| 4,786,078 | 11/1988 | Schreier et al. | 297/483 X |
| 4,832,367 | 5/1989 | Lisenby | 297/483 |
| 4,938,535 | 7/1990 | Condon et al. | 297/483 |
| 4,946,198 | 8/1990 | Pittore et al. | 297/483 X |

*Primary Examiner*—James R. Brittain

[57] ABSTRACT

A seat belt safety clip for orienting a shoulder seat belt away from a passenger's head and neck when the passager is restrained by the shoulder belt and a lap seat belt. The seat belt safety clip includes a frame member having a longitudinal slot for retaining a portion of the shoulder seat belt, and a clip member longitudinally attached to the frame member for retaining a portion of the lap seat belt between the frame member and the clip member. The frame member has a receiving member including a pair of spaced apart lips, and the clip member has a mating member including a pair of spaced apart hooks, such that the two hooks of the clip member can be engaged to the two lips of the frame member respectively, so that the clip member is removably attached to the frame member.

5 Claims, 1 Drawing Sheet

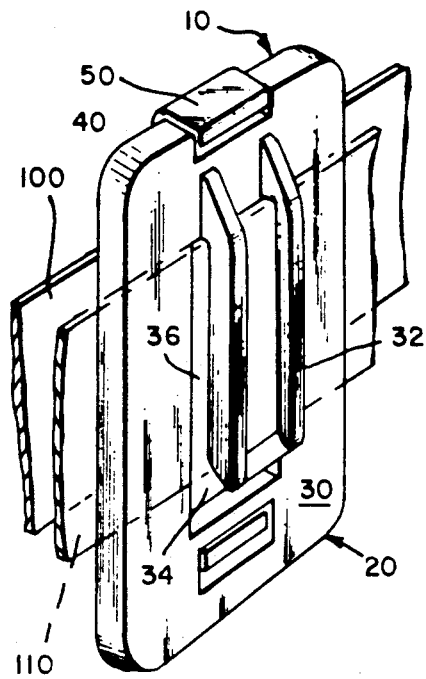
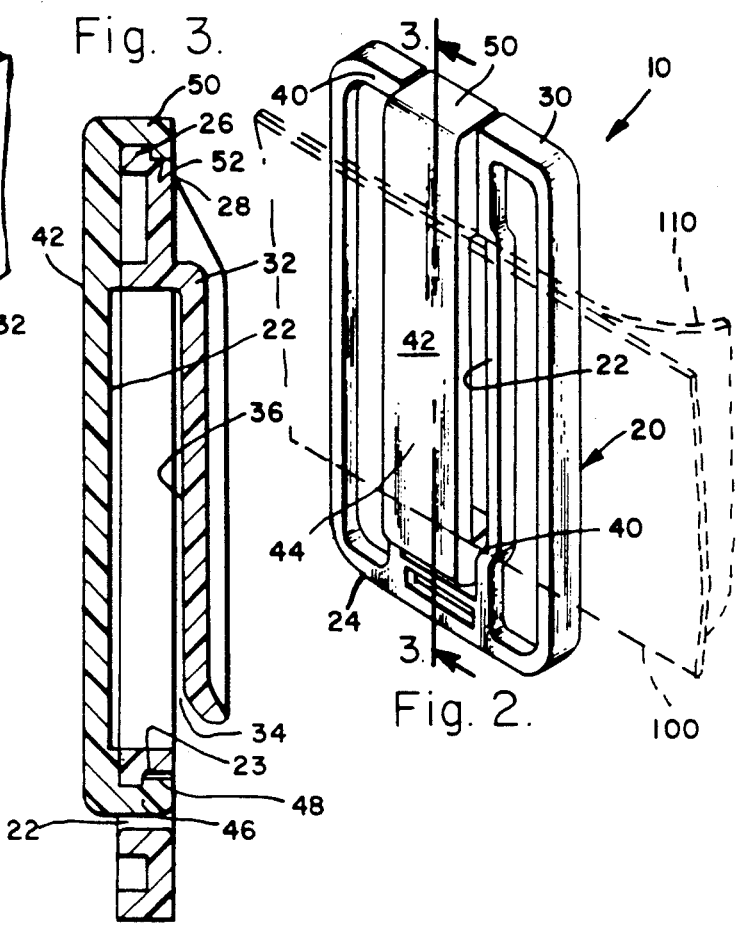
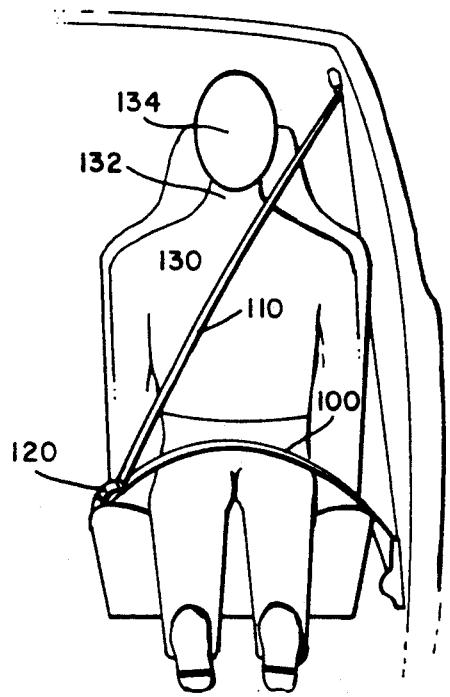
Fig. 1.
Fig. 3.
Fig. 2.
Fig. 4.
(PRIOR ART)
Fig. 5.

SEAT BELT SAFETY CLIP

BACKGROUND OF THE INVENTION

1. Field of the Invention

The present invention relates to the field of seat belts for passenger vehicles such as automobiles. In particular, the present invention relates to a safety device for altering the angle of the shoulder belt as it comes across the passenger's body when fastened to cause the degree of arc by the shoulder belt to be oriented away from the passenger's neck.

2. Background of the Invention

In general, seat belts are well known in the prior art. One type of seat belt is pulled from a retractable retaining mechanism and spreads across the user's lap and is removably locked in a receiving mechanism so that the seat belt restrains the passenger from being thrown out of the seat. Such belts are conventionally found in passenger transportation vehicles such as airplanes and in the rear seats of vehicles such as automobiles. They are conventionally known as lap seat belts. A second type of seat belt is a shoulder belt which is pulled from a retractable holder located above and to one side of the passenger seat and comes across the passenger's torso and is removably locked in place by a receiving mechanism located below and to the opposite side of the passenger seat. The shoulder belt also serves to restrain the passenger from being thrown forward in the event of a sudden stop or accident. These are conventionally known as shoulder seat belts. One problem with many shoulder seat belts is that the diagonal angle of the arc of the shoulder seat belt frequently comes in contact with the passenger's neck and is uncomfortable. It may rub against the passenger's neck and also snap against the passenger's neck in the event of a sudden stop or accident, thereby possibly causing injury. Such shoulder seat belts are commonly found in the front seats of passenger automobiles. A combination belt frequently used in modern day passenger automobiles is a combination of a lap seat belt and shoulder seat belt having single locking mechanism. The lap seat belt is removably retained in a retracting mechanism below and to one side of the passenger seat while the shoulder seat belt is removably retained in a retractable storage mechanism located above and to the same side of the passenger seat. The ends of both belts are joined to a single mating clip which is in turn removably fastened to an engaging mechanism so that the lap seat belt spreads across the passenger's lap and the shoulder seat belt comes diagonally across the user's torso. The same problems with the shoulder seat belt exist in the combination as with the individual shoulder seat belt.

There is no know apparatus or method by which the diagonal direction of the shoulder seat belt can be altered to continue to provide security for passenger restraint while at the same time causing the angle of the shoulder seat belt to be moved away from the passenger's neck and thereby remove the discomfort and possible hazard. A significant need exists for such an improved device.

SUMMARY OF THE PRESENT INVENTION

The present invention is a specialized clip which is designed to be movably affixed at any desired location along the length of the passenger lap seat belt and provide a mating retaining means to engage a portion of the passenger shoulder seat belt at any desired location along the length of the passenger shoulder seat belt to thereby cause the angle of orientation of the shoulder seat belt to be shifted to any desired arc as it rests across the passenger's torso and thereby prevents the shoulder seat belt from coming in contact with the passenger's neck.

It has been discovered, according to the present invention, that if a clip is constructed having a generally flat area on its rear surface against which the passenger lap seat belt can rest and further includes a pair of spaced apart mating members to receive a mating locking clip, then the passenger lap seat belt can be retained between the rear surface and the mating locking clip in a manner which permits the clip to be affixed to the location where it is attached. In addition, this arrangement permits the clip to be removed and fastened to any other different location along the length of the lap seat belt to thereby accommodate passengers of different size and shape.

It has further been discovered, according to the present invention, that if the opposite surface of the mating locking clip comprises a hook member open at its lower surface, then any desired location along the length of the shoulder seat belt can be retained by being placed into the open hook member and thereby cause the orientation of the shoulder seat belt to be guided depending on the location of the locking clip on the lap seat belt.

Defined broadly, the present invention is a seat belt adjuster including a clamping device for securing two pieces of webbing together by use of a generally rectangular flat straight member made of material such as plastic which includes two clips, with a clip affixed to a respective opposite surface of the rectangular flat member. One clip curves toward the rectangular flat surface and preferably is a separate removable structure, which is used to secure the lap seat belt. The other clip curves away from the rectangular flat surface and is open at its lower edge to thereby receive the shoulder seat belt and retain it between the clip and the flat generally rectangular surface.

It is therefore an object of the present invention to provide a seat belt safety clip which is a guiding member that serves to secure the shoulder seat belt to the lap seat belt in a manner by which the direction of the arc of the shoulder seat belt is guided to avoid coming in contact with the passenger's neck and/or face after the seat belts are locked in place to retain the passenger.

It is another object of the present invention to provide a seat belt safety clip guiding member which can be positioned at any desired location along the length of the lap seat belt and further can be easily moved to various different positions along the length of the lap seat belt to accommodate different size and shape passengers.

It is an additional object of the present invention to create an economical and simple clamping device that can be readily made in a two-step molding operation, using plastic material and the like. It also an object to create a thin and flat clamping device which can be readily made from a simple plastic molding operation.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a front perspective view of the present invention seat belt safety clip.

FIG. 2 is a rear perspective view of the present invention seat belt safety clip.

FIG. 3 is a cross-sectional view taken along line 3—3 of FIG. 2.

FIG. 4 is a diagrammatic view of a passenger restrained by a conventional seat belt without the present invention.

FIG. 5 is a diagrammatic view of a passenger restrained by a conventional seat belt with the present invention seat belt safety clip in place.

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Referring particularly to FIGS. 1 through 3, there is shown at 10 the present invention seat belt safety clip. The seat belt safety clip 10 comprises a generally rectangular flat frame member 20 having a generally flat front surface 30 and a rear surface 40. Permanently affixed to the front surface 30 is a downwardly extending retaining first clip member 32 which extends forwardly or away from the front surface 30 for a short distance and thereafter extends downwardly in a direction generally parallel to the front surface 30. The first clip member 32 is open at its lower end to be able to receive a piece of webbing illustrated in FIG. 1 as 110. The webbing can be a car seat belt which is retained between front surface 30 and the interior of clip 32. Opening 34 leads to recess 36 between front surface 30 of frame 20 and the interior of first clip member 32. The shoulder seat belt 110 fits into recess 36. The frame member 20 further comprises receiving means for receiving a second removable clip member 42 proximate the rear surface 40 of frame member 20. The receiving means comprises a centrally disposed opening 22 extending transversely through the entire frame member 20 adjacent its lower end 24 and a centrally disposed lip 26 adjacent the upper end 28 of frame member 20. The second removable clip member 42 comprises a generally flat elongated body 44 and a pair of mating members for joining the second removable clip member 42 to the receiving means 22 and 26 of frame member 20. The mating members are a pair of transverse hook members 46 and 50 which extend transversely to elongated body 44 at each end and terminate in hook 48 and 52 respectively. As illustrated in FIG. 3, first mating member 46 extends through receiving member opening 22 and is locked in place by hook 48 attaching adjacent to a lip 23 of frame 20 which extends into opening 22. Second mating member 50 extends over upper lip 26 and is locked in place by hook 52. In this manner, second removable clip member 42 is locked onto frame 20 and can receive a piece of webbing such as lap seat belt 100 between rear surface 40 of frame member 20 and the interior of second clip member 42.

The present invention seat belt safety clip 10 is shown in use in FIG. 5. Referring first to FIG. 4, there is illustrated a conventional seat belt structure with lap set belt 100 and shoulder seat belt 110 joined at clip 120 and locked in place. Passenger 130 has the shoulder seat belt 110 come across his torso and as illustrated in FIG. 4. The shoulder seat belt is also very close to his neck 132. If the passenger 130 seeks to move forward in his seat, the shoulder seat belt 110 will cut across his neck and possibly his face 134. In the event of a sudden stop or accident, the passenger 130 will be thrown forward and while the lap seat belt 100 and shoulder seat belt 110 will serve to restrain the passenger 130, the shoulder seat belt can also cause injury to the passenger's neck 132. The improvement with the present invention seat belt safety clip 10 is illustrated in FIG. 5. In operation, the passenger 130 first clips in the lap seat belt 100 and shoulder seat belt 110 via clip 120. The the seat belt safety clip 10 is placed over lap seat belt 100 such that rear surface 40 rests against lap seat belt 100 and second removable clip member 44 is inserted onto frame 20 as previously described, thereby entrapping a portion of lap seat belt 100 between the rear surface 40 of frame 20 and the interior of removable clip member 42. The attachment can be made at any desired location along the length of lap seat belt 100. The passenger then pulls on shoulder seat belt 110 until a portion of shoulder seat belt 110 is inserted through the opening 34 between the lower end of first fixed clip member 32 and front surface 30 of frame 20. Due to the tension of shoulder seat belt 34 being pulled back to its retracting holding member in the vehicle, the shoulder seat belt will move into the recess 36 between front surface 30 and the interior of first clip 32 and will be held in place. As illustrated in FIG. 5, by positioning the seat belt safety clip 10 at the proper orientation on lap seat belt 100, the shoulder seat belt 110 is forced to extend over the torso at a location remote from the passenger's neck 132 and face 134 and as a result there is no risk that the shoulder seat belt 110 will cut the passenger's neck or face 134 even if the vehicle comes to a short stop or there is an accident.

The present invention seat belt safety clip 10 can be made out of any desired material although plastic is preferred since it is easily and inexpensively molded and provides a simple lightweight product. However, any other suitable material such as metal or rubber are also materials out of which the seat belt safety clip can be made. The seat belt safety clip can be configured in any desired dimension to accommodate different widths of seat belts.

Therefore, the present invention may be defined as a seat belt safety clip comprising: (a) a frame member having a front surface, a rear surface, a top edge and a bottom edge; (b) a first clip member attached to said front surface of said frame member and extending generally parallel to and spaced apart from said front surface and terminating in a lower tip proximate the bottom edge of said frame member, thereby forming an opening adjacent the lower tip which leads to a recess between the front surface and the first clip member; (c) said frame member further comprising clip member receiving means; and (d) a removable second clip member including a generally elongated flat body and a pair of mating members for engagement with said clip member receiving means for attachment adjacent the rear surface of said frame member so that the elongated flat body lies parallel to said rear surface of said frame member; (e) whereby said frame member may be fastened to a location along the length of a lap seat belt by entrapping a portion of the lap seat belt between said rear surface of said frame and said removable second clip member and a portion of the length of a shoulder seat belt may be inserted into the recess between said front surface and said first clip member to thereby cause the shoulder seat belt to be oriented across a passenger's torso and away from the passenger's neck.

The clip member receiving means in said frame comprise a centrally disposed opening extending transversely through the entire frame member adjacent its lower end with a lip extending partially into the opening and a centrally disposed upper lip adjacent the upper end of the frame member, and the mating members of said removable second clip member further comprises a pair of transverse hook members which extend transversely to the elongated body at each end and terminate in a hook such that a respective one hook engages a respective one of the lips in the clip member receiving means.

Defined more broadly, the present invention is a seat belt safety clip for orienting a shoulder seat belt away from a passenger's head and neck when the passenger is retrained by the shoulder seat belt and a lap seat belt, comprising: (a) means for attaching said seat belt safety clip to said lap seat belt; and (b) said seat belt safety clip including means for engaging and retaining a portion of said shoulder seat belt.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus is intended only for illustration and for disclosure of an operative embodiment and not to show all of the various forms of modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A seat belt safety clip comprising:
  a. a generally rectangular frame member having a flat front surface, a rear surface, a top edge and a bottom edge;
  b. a first clip member attached to said front surface of said frame member and extending generally parallel to and spaced apart from said flat front surface and terminating in a lower tip proximate the bottom edge of said frame member, thereby forming an opening adjacent the lower tip which leads to a recess between the front surface and the first clip member;
  c. said frame member further comprising clip member receiving means in said frame including a centrally disposed opening extending transversely through the entire frame member adjacent its lower end with a lip extending partially into the opening and a centrally disposed upper lip adjacent the upper end of the frame member; and
  d. a removable second clip member including a generally elongated flat body and a pair of mating members including a pair of transverse hook members which extend transversely to the elongated body at each end and terminate in a hook such that a respective one hook engages a respective one of the lips in the clip member receiving means so that the elongated flat body lies parallel to said rear surface of said frame member;
  e. whereby said frame member may be fastened to a location along the length of a lap seat belt by entraping a portion of the lap seat belt between said rear surface of said frame member and said removable second clip member and a portion of the length of a shoulder seat belt may be inserted into the recess between said flat front surface and said first clip member to thereby cause the shoulder seat belt to be oriented across a passenger's torso and away from the passenger's neck.

2. A seat belt safety clip in accordance with claim 1 wherein said frame member and first clip member are made of one piece molded plastic and said removable second clip member is made of molded plastic.

3. A seat belt safety clip comprising:
  a. a frame member having a front surface, a rear surface, a top edge and a bottom edge;
  b. a first clip member attached to said front surface of said frame member and extending generally parallel to and spaced apart from said front surface and terminating in a lower tip proximate the bottom edge of said frame member, thereby forming an opening adjacent the lower tip which leads to a recess between the front surface and the first clip member;
  c. said frame member further comprising clip member receiving means in said frame including a centrally disposed opening extending transversely through the entire frame member adjacent its lower end with a lip extending partially into the opening and a centrally disposed upper lip adjacent the upper end of the frame member; and
  d. a removable second clip member including a generally elongated flat body and a pair of mating members including a pair of transverse hook members which extend transversely to the elongated body at each end and terminate in a hook such that a respective one hook engages a respective one of the lips in the clip member receiving means so that the elongated flat body lies parallel to said rear surface of said frame member;
  e. whereby said frame member may be fastened to a location along the length of a lap seat belt by entrapping a portion of the lap seat belt between said rear surface of said frame member and said removable second clip member and a portion of the length of a shoulder seat belt may be inserted into the recess between said front surface and said first clip member to thereby cause the shoulder seat belt to be oriented across a passenger's torso and away from the passenger's neck.

4. A seat belt safety clip in accordance with claim 3 wherein said frame member and first clip member are made of one piece molded plastic and said removable second clip member is made of molded plastic.

5. A seat belt safety clip in accordance with claim 3 wherein said frame member is generally rectangular.

* * * * *